(12) United States Patent
French et al.

(10) Patent No.: US 7,823,834 B2
(45) Date of Patent: *Nov. 2, 2010

(54) DOOR CONFIGURED TO CLOSE AN OPENING INSIDE AN AIRCRAFT

(75) Inventors: Clive French, Nottingham (GB); Smail Maksen, Grenade (FR)

(73) Assignees: Airbus, Blagnac (FR); Airbus Deutschland GmbH, Hamburg (DE)

( * ) Notice: Subject to any disclaimer, the term of this patent is extended or adjusted under 35 U.S.C. 154(b) by 251 days.

This patent is subject to a terminal disclaimer.

(21) Appl. No.: 11/195,749

(22) Filed: Aug. 3, 2005

(65) Prior Publication Data

US 2006/0169840 A1 Aug. 3, 2006

Related U.S. Application Data

(60) Provisional application No. 60/606,526, filed on Sep. 2, 2004.

(30) Foreign Application Priority Data

Aug. 3, 2004 (FR) .................................. 04 08584

(51) Int. Cl.
B64C 1/14 (2006.01)
(52) U.S. Cl. .................. 244/129.5; 244/129.4; 454/71; 454/73; 454/76; 454/195; 49/31; 49/62
(58) Field of Classification Search ............. 244/118.5, 244/117 R, 129.5, 129.4; 296/208; 454/71, 454/73, 76, 195, 259; 49/477, 31, 62, 280
See application file for complete search history.

(56) References Cited

U.S. PATENT DOCUMENTS

| 4,506,851 | A | * | 3/1985 | Gupta et al. | 244/129.1 |
|---|---|---|---|---|---|
| 4,930,564 | A | * | 6/1990 | Fernandez | 164/169 |
| 4,972,765 | A | * | 11/1990 | Dixon | 454/164 |
| 5,194,038 | A | * | 3/1993 | Klomhaus et al. | 454/162 |
| 5,244,184 | A | * | 9/1993 | Larseneur | 251/294 |
| 5,447,470 | A | * | 9/1995 | Zaniewski | 454/259 |
| 6,019,315 | A | * | 2/2000 | Scherer et al. | 244/129.5 |
| 6,871,821 | B2 | * | 3/2005 | Takahama | 244/129.5 |
| 6,945,497 | B2 | * | 9/2005 | Saku et al. | 244/129.5 |
| 6,988,574 | B2 | * | 1/2006 | Jones | 180/68.1 |
| 2003/0052227 | A1 | * | 3/2003 | Pittman | 244/118.5 |
| 2003/0066930 | A1 | * | 4/2003 | Pratt et al. | 244/118.5 |

(Continued)

FOREIGN PATENT DOCUMENTS

EP 1 398 437 3/2004

(Continued)

*Primary Examiner*—Timothy D Collins
*Assistant Examiner*—Philip J Bonzell
(74) *Attorney, Agent, or Firm*—Oblon, Spivak, McClelland, Maier & Neustadt, L.L.P.

(57) ABSTRACT

This door includes a device that permits air to flow through the door in one direction but prevents this flow of air in the opposite direction.

On the attached illustration, the door includes at least a window (74), that less air pass through as well as an elastic membrane (76) covering window (74).

Elastic membrane (76) includes on the one hand an area that is airtight facing window (74) and capable of fully covering it and on the other hand, an area that is pervious to air near the impervious area.

22 Claims, 9 Drawing Sheets

U.S. PATENT DOCUMENTS

2003/0159629 A1* 8/2003 Donovan .................... 110/341
2003/0192989 A1* 10/2003 Owen et al. .............. 244/118.5
2003/0222175 A1* 12/2003 Movsesian et al. ....... 244/118.5
2004/0046084 A1 3/2004 Brzeski et al.
2005/0109470 A1* 5/2005 Freudenberg et al. ....... 160/135
2006/0048449 A1* 3/2006 Roques et al. ................. 49/62
2006/0169839 A1 8/2006 French et al.

FOREIGN PATENT DOCUMENTS

FR 2 848 179 6/2004

* cited by examiner

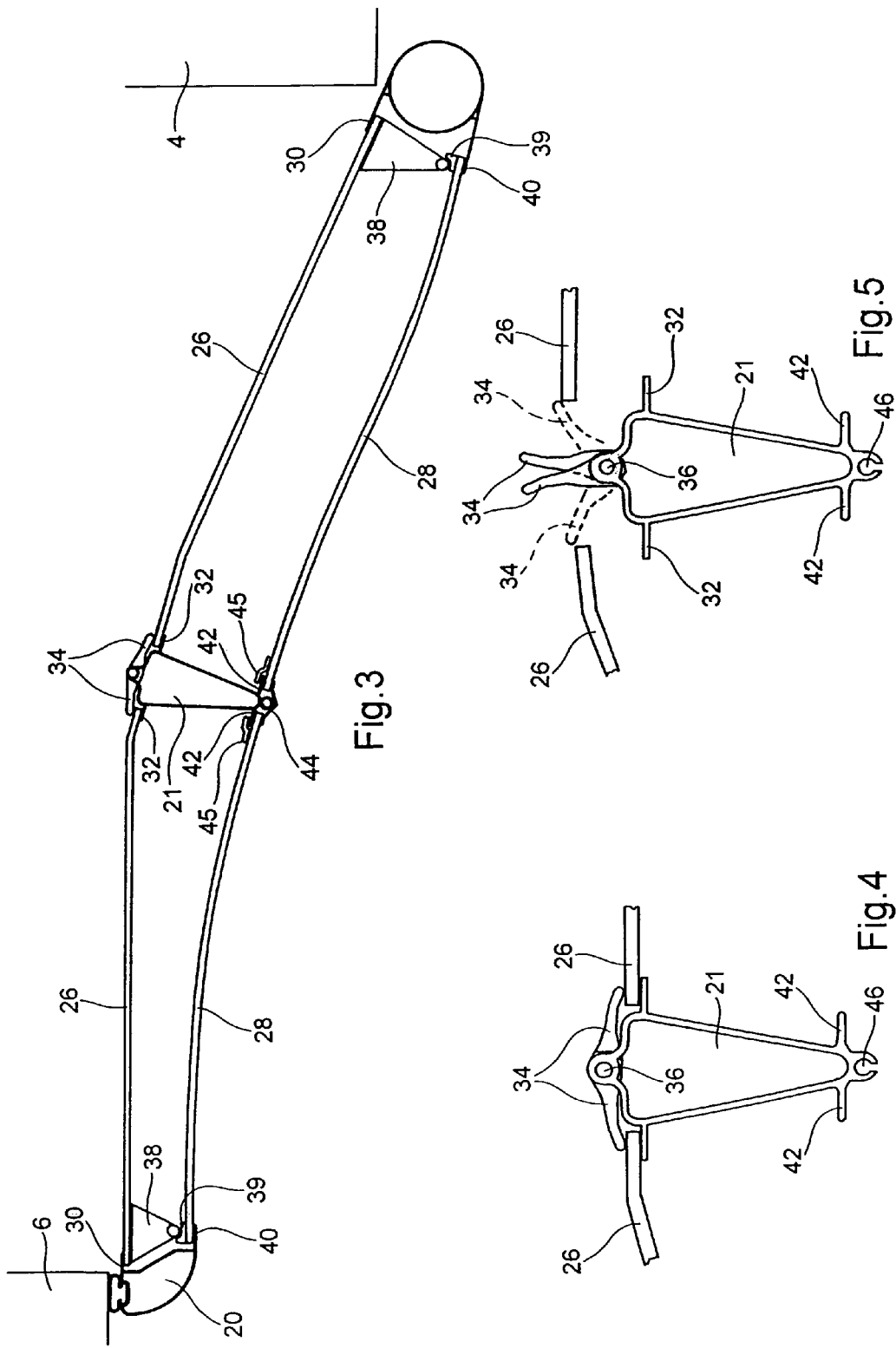

DOOR CONFIGURED TO CLOSE AN OPENING INSIDE AN AIRCRAFT

BACKGROUND OF THE INVENTION

1. Field of the Invention

This invention involves a door used for closing an opening inside an aircraft.

2. Discussion of the Background

Inside an aircraft, there are several doors that open up into the cabin. First of all, there is the door separating the cabin from the cockpit. This is a somewhat special door. Indeed, following the Sep. 11, 2001 attacks, this door has been reinforced in all planes to withstand, among other, bullets and prevent access to all unauthorized people.

There are also doors to access different spaces: toilets, kitchen, etc. These rooms are usually ventilated and to avoid creating excess pressure, means must be provided to let the air exit the space.

This invention also involves a door that, at the time of filing this application, does not exist in aircraft in service. In certain aircraft, such as long haul aircraft, the door of the cockpit is located at the end of an aisle that leads to a space used essentially by navigating personnel and where, in general, the toilets are located. Some airline companies accept that these toilets be used by passengers. In some planes, this aisle may be closed off by a second door on the cabin side. Such a door would then create a private space behind the cockpit reserved for navigating personnel. With such a door being present, access to toilets located there would then be prohibited to passengers. Such a door also forms a visual barrier preventing passengers from seeing the cockpit door. This permits increasing security at the cockpit level. Indeed, even if this cockpit door is reinforced, when a crew member enters or leaves the cockpit, this door is open, thus providing free access to an intruder who might take advantage of the opening of this door.

The aeronautical construction codes provide that the cockpit door must open automatically when a depression occurs inside the cockpit or cabin. As such, pressures can equalize on both sides of the cockpit door, thus preventing an excessively high stress on the aircraft structure.

SUMMARY OF THE INVENTION

The new door, that permits creating a private space behind the cockpit, must not hamper operation of the cockpit door. When a depression occurs inside the cockpit, a large quantity of air is sucked through the private space towards the cockpit. Taking into account the importance of this air flow, the new door must open instantaneously. If, on the other hand, a depression occurs inside the cabin, taking into account the ratio of volumes between the cockpit (including the private space) and the cabin, the air flow passing through the new door is relatively limited (with respect to the depression in the cockpit).

This invention involves the means that permits air to pass through when a depression occurs in the cabin, from the aisle located between the cockpit door and the new door to the cabin.

The original idea for this invention is to have a door that lets a flow of air pass through in a given direction while having a relatively airtight door in the opposite direction so as to, for instance, form a barrier to sound, dust and/or fumes. As such, this invention is aimed at providing the means so as not to disturb operation of the cockpit door at the new door when a depression takes place inside the cabin and to form a barrier in the opposite direction.

For this purpose, it proposes a door that closes an opening inside an airplane, characterized by the fact that it includes a device that permits air to pass through the door in one direction but that prevents air from passing through in the opposite direction.

As such, ventilation can be provided in a space inside the aircraft without having to provide for special openings to circulate the air. The size of the device forming a check valve is adjusted to the air flow that has to pass through the door. One can also adjust the number of air passage devices.

The specialist in the field is aware of several devices permitting the air passage in one direction. As such, one can for instance provide for a mounted shutter that pivots around a pin that is considerably horizontal and that covers a window in the door. Under the effect of gravity, the shutter has the tendency of closing and obstructing the window. On the other hand, when an overpressure occurs on the side of the window opposite the shutter, the shutter has the tendency of opening and letting air pass through. Impervious devices can be provided around the window or at the periphery of the shutter to permit a better closing of the window. One can also provide that the door includes at least a window that permits air passing through as well as an elastic membrane that covers the window, that the elastic membrane includes on the one hand an area impervious to air facing the window and capable of fully covering the latter and on the other hand, an area that is pervious to air arranged near the impervious area. In this case, the area of the membrane that is pervious to air has for instance, holes cut out in the membrane to let air pass through.

However, a preferred mode of execution of the door provides that the latter includes at least a window that lets air pass through as well as an elastic membrane, and that the elastic membrane can be deformed between the first position in which it covers the whole window and a second position in which the major portion of the elastic membrane is separated from the window. The use of a membrane is beneficial because the inertia of a membrane is weak and the membrane can by itself assure a tight closing of the window.

In this preferred mode of execution, a cover is beneficially set up at a distance from the window, on the side of the membrane so as to limit deformation of the membrane. This cover has for instance a peripheral perforated skirt having at its free end an edge that extends towards the outside of the skirt, and the peripheral edge of the membrane is beneficially sandwiched between the edge of the skirt and the periphery of the window. This ensures a good attachment of the membrane and a good imperviousness at the window in its closed position.

Preferably, the membrane has at least a free edge. The membrane used is for instance made of polyurethane. To collect the electrical charges of the air passing over the membrane, the latter has beneficially a metal grill, for instance, in copper, on one of its faces, and this grill is linked to an electrical ground. Another function of this grill is to make the membrane structure more rigid.

A door according to the invention has, for instance, a front face and a rear face separated one from the other, and the device that lets air pass through the door in one direction but prevents this passage in the opposite direction, can be located in the space left between the two faces of the door. One face of the door is then possibly perforated.

Also, to obtain filtering of the air that passes through the door and thus to prevent dust and/or fumes from passing through, a filter is beneficially associated with the device that lets air pass through the door in one direction but prevents this passage in the opposite direction.

BRIEF DESCRIPTION OF THE DRAWINGS

This invention also involves an aircraft characterized by the fact that it includes a door as described above.

Details and advantages of this invention will appear even more from the description that follows, referenced against the attached schematic drawing, on which:

Figure 1:
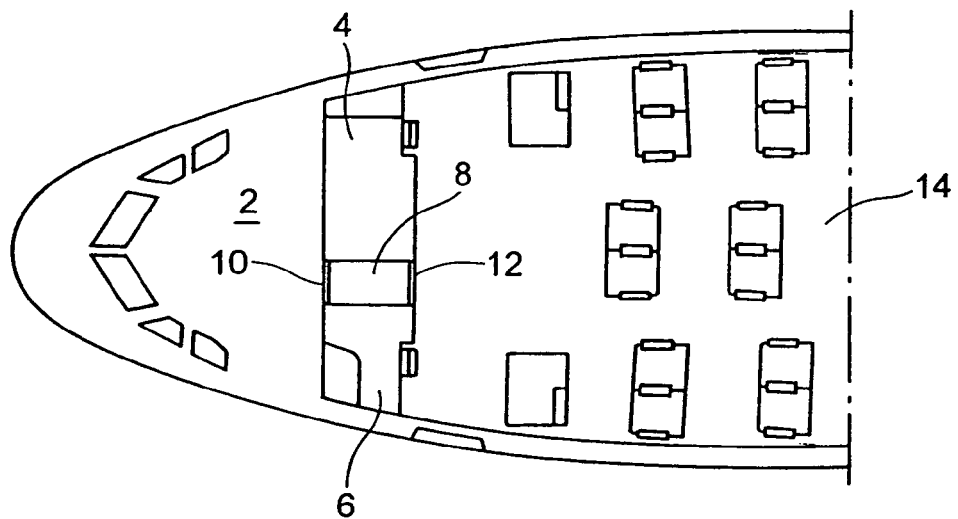
Figure 2:
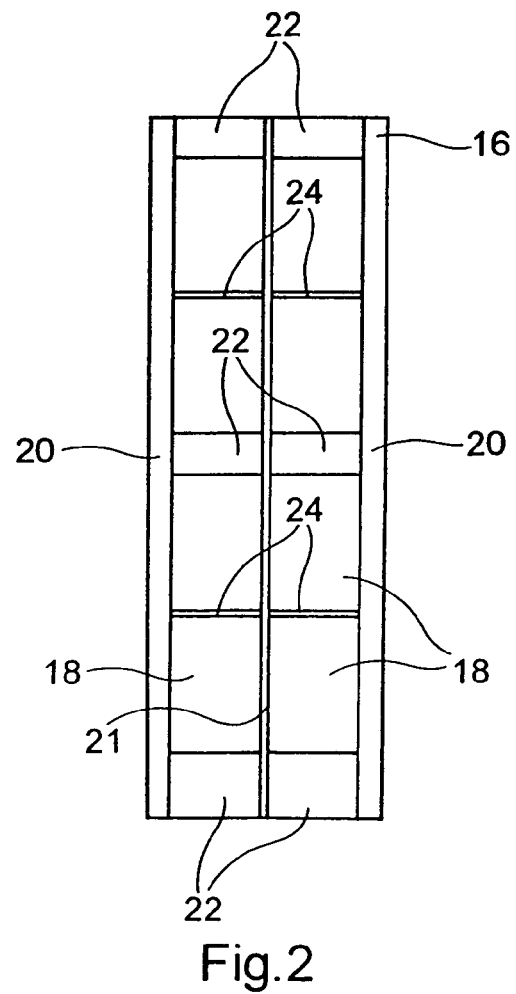
Figure 6:
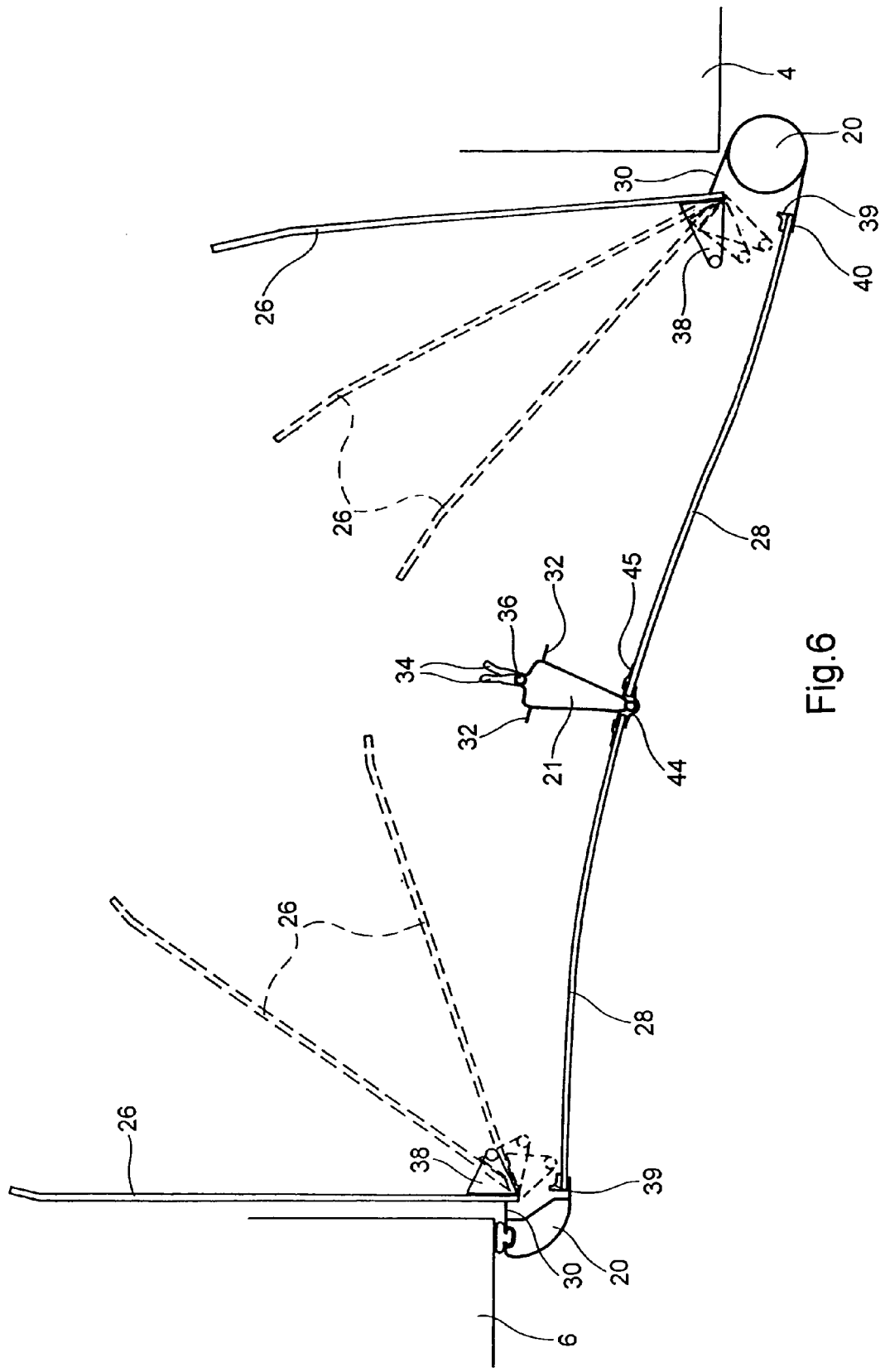
Figure 7:
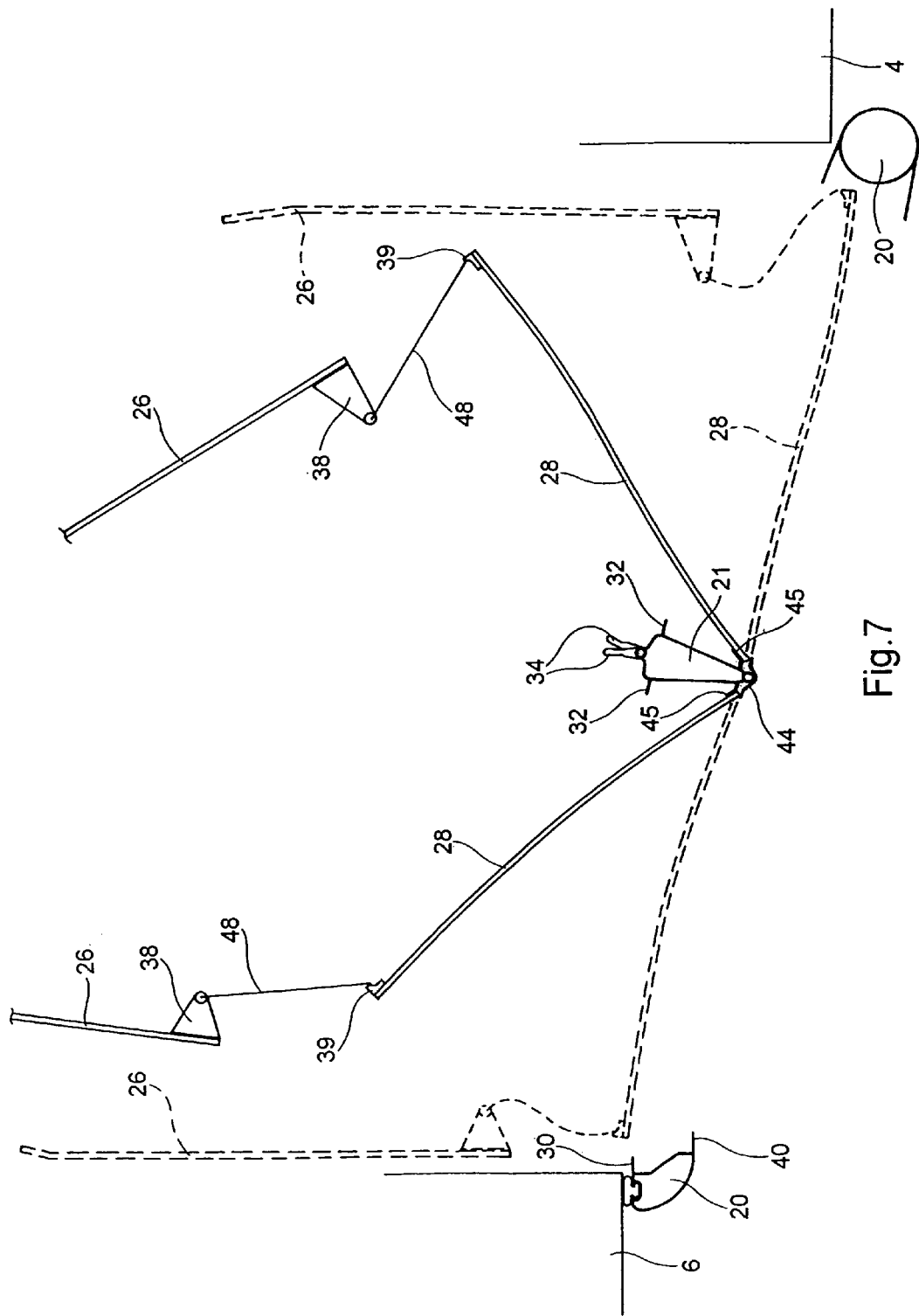
Figure 8:
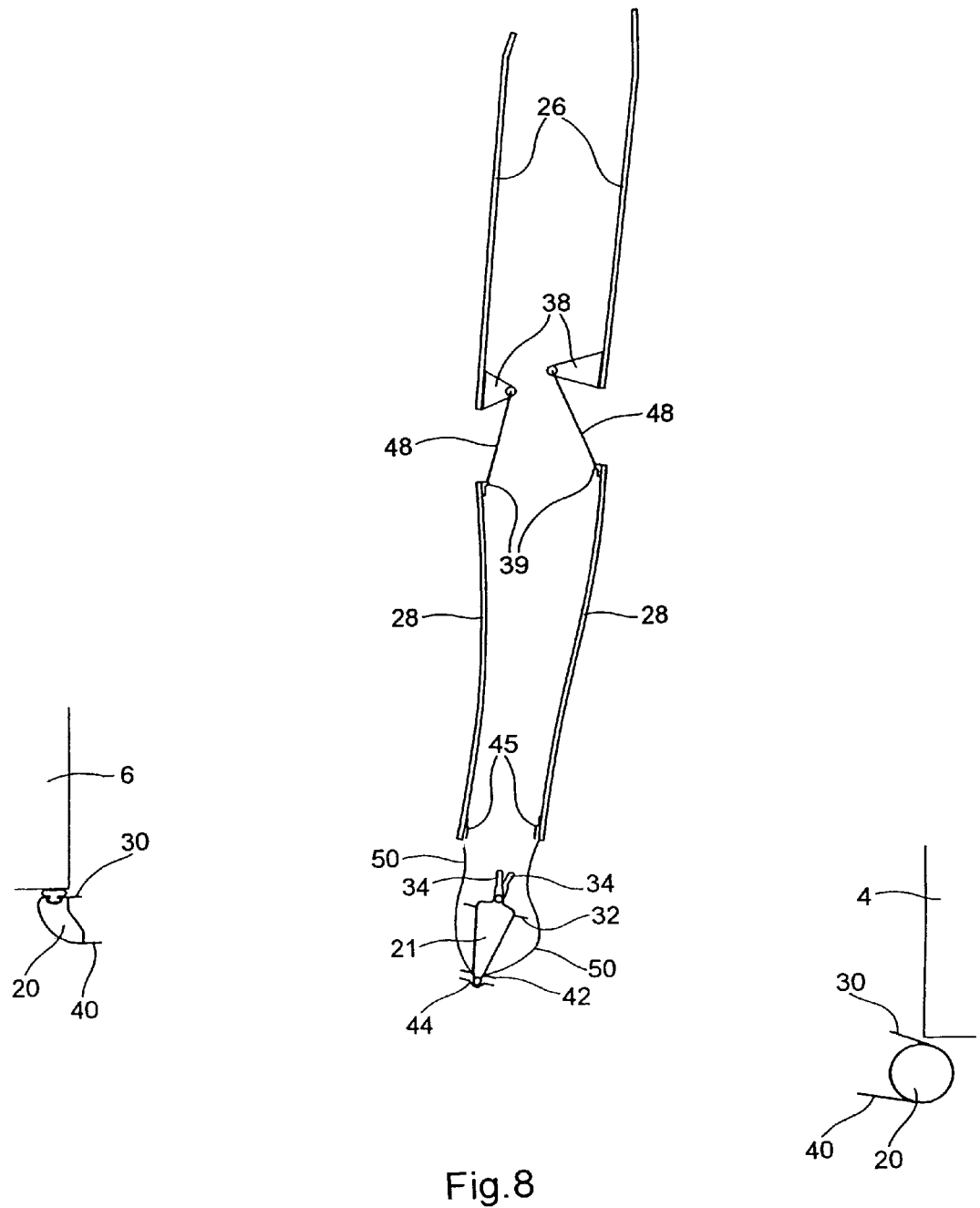
Figure 9:
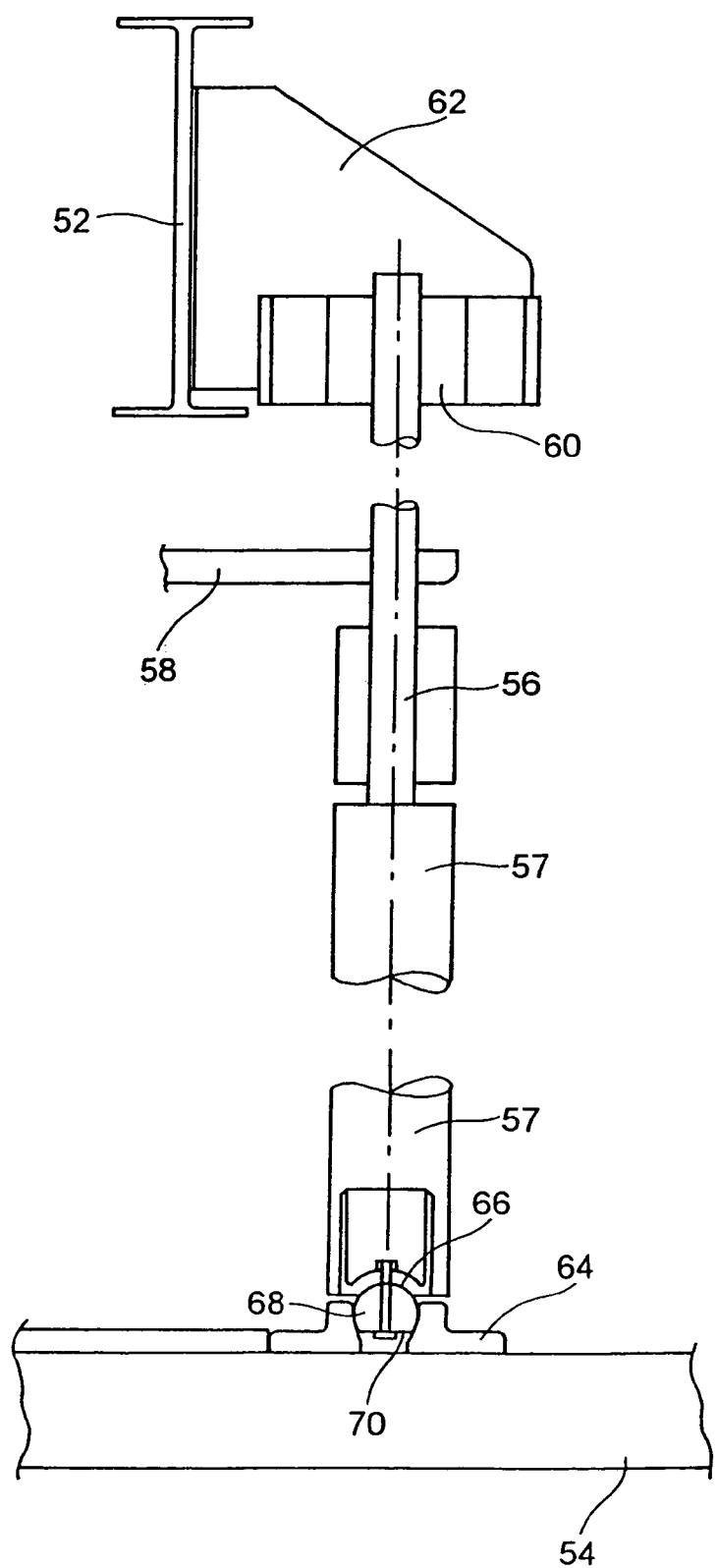
Figure 10:
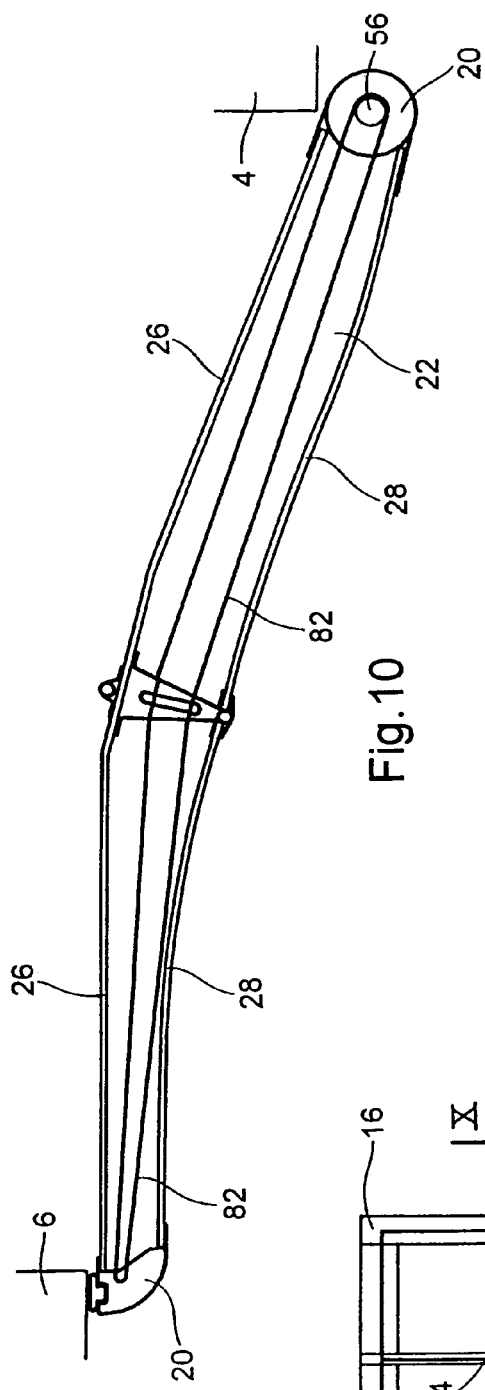
Figure 11:
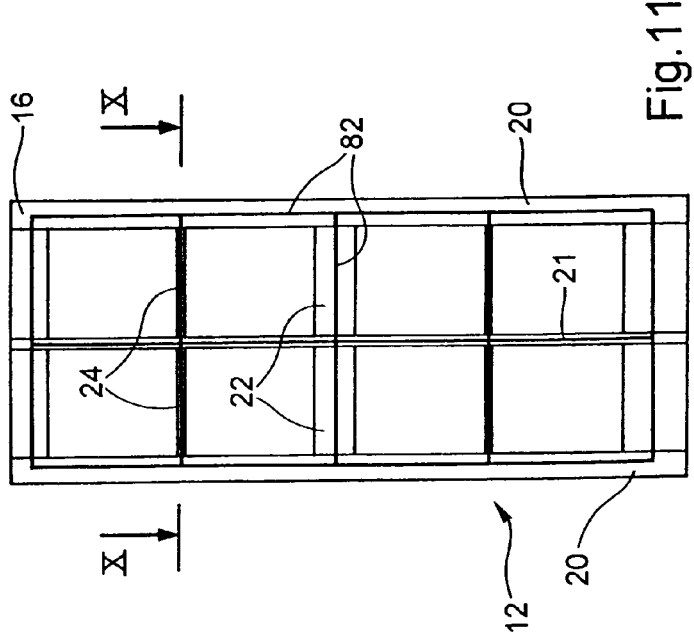
Figure 12:
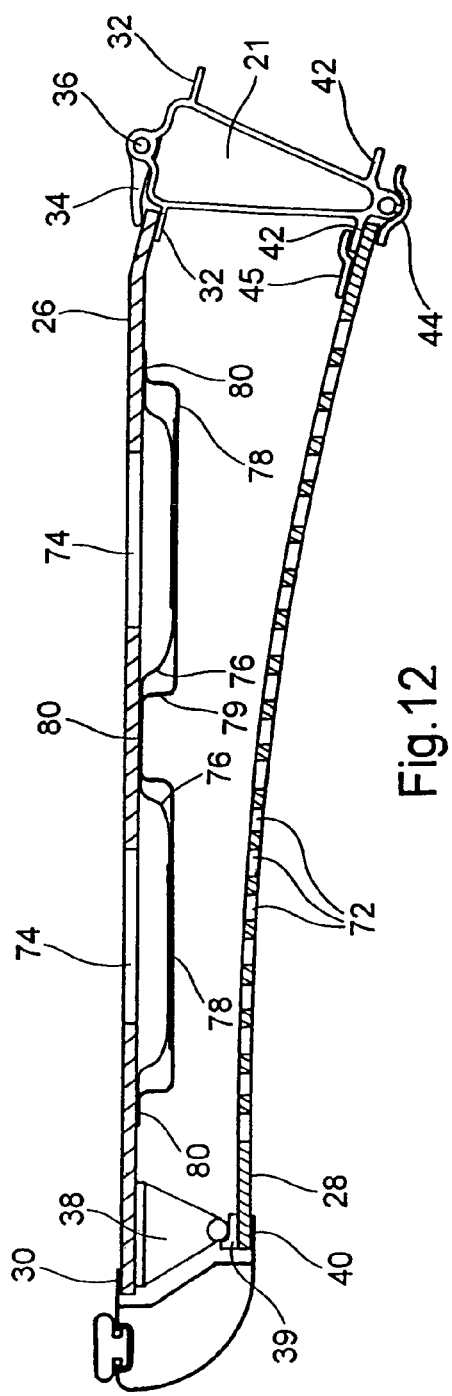
Figure 13:
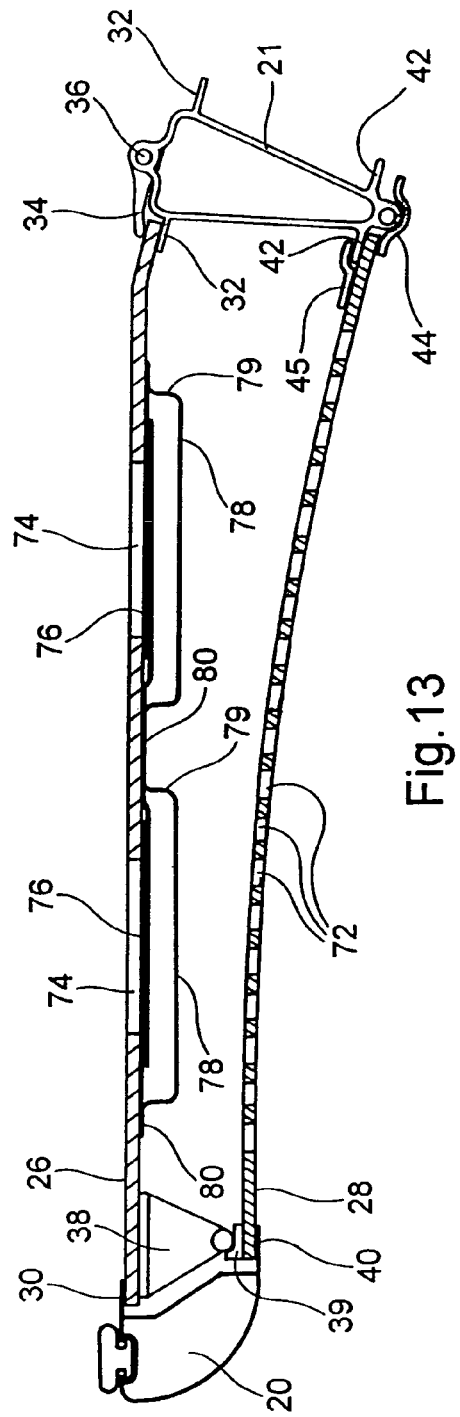
Figure 14:
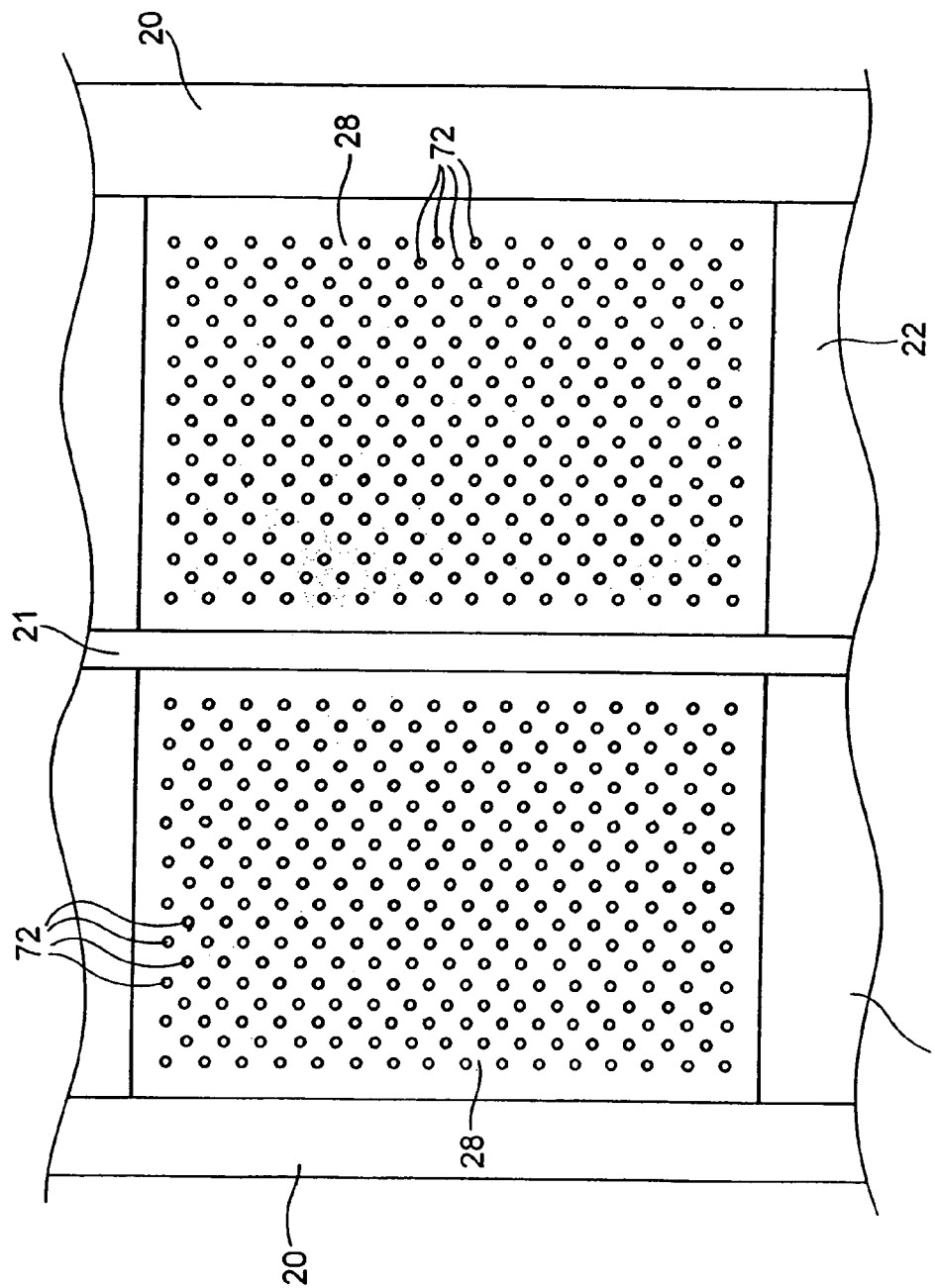

Illustration 1 is a partial cross-sectional overhead view of the front part of an aircraft;

Illustration 2 is a front view of a door according to the invention;

Illustration 3 is a horizontal sectional view according to the sectional line III-III of illustration 2, at enlarged scale;

Illustration 4 is a detail view of a release mechanism shown on illustration 3 in the locked position;

Illustration 5 shows the mechanism of FIG. 4 in the unlocked position;

Illustrations 6 to 8 are views for illustration 3 when a depression occurs in the aircraft cockpit;

Illustration 9 is an elevated view of the structure carrying the door of illustration 2;

Illustration 10 is a sectional view of the sectional line X-X of illustration 11

Illustration 11 is a front view for illustration 2 showing a structural reinforcement that might be applied to the door of illustration 2;

Illustrations 12 and 13 are enlarged scale views for the view of illustration 3 and showing an improvement of a door panel according to the invention and Illustration 14 shows a front view of an assembly of two panels as those shown on illustrations 12 and 13.

DETAILED DESCRIPTION OF THE PREFERRED EMBODIMENTS

On illustration 1, one recognizes a cockpit 2 of a long haul carrier plane. Immediately behind the cockpit, there is a space specifically provided for the crew members. This space includes on the one hand a rest area 4 comprising for instance, cots or beds and on the other hand, sanitation facilities such as toilets, a wash basin and a shower. An aisle 8 is provided between the rest area 4 and the sanitation facilities 6 providing access to cockpit 2. Classically, a door 10 closes cockpit 2 and provides access thereto.

Cockpit door 10 closes off aisle 8 to one of its extremities. In an original way, it is proposed to provide a second door 12 at the other end of aisle 8.

Second door 12 has two main functions. A first function is to hide cockpit door 10 from the passengers' view. For this first function, this second door 12 can be located in an intermediate position in aisle 8 or else at the end of this aisle 8 opposite cockpit door 10. Another function of this second door is to provide privacy to an area reserved for the crew members. For this second function, second door 12 is preferably located at the end of aisle 8 opposite cockpit door 10, as shown on illustration 1.

For security reasons, cockpit door 10 is locked during flight and means (access code, badge, . . . ) are provided to keep all unauthorized personnel from accessing the cockpit. This cockpit door 10 is also bullet-proof. However, when a depression occurs in cabin 14 of the aircraft, means provide for the automatic opening of this door so as to equalize the pressures between cabin 14 and cockpit 2 and as such preventing too much stress on the aircraft structure.

Second door 12 must not disturb the operation of cockpit door 10, such as when a depression occurs in cockpit 2. Illustration 2 shows a frontal view of a preferred form of execution for second door 12 shown on illustration 1. This door includes an internal structure called frame 16 in the description. Eight panels 18 are mounted on this frame 16.

Frame 16 includes two lateral posts 20 and a central post 21 linked by three torsion boxes 22, a top box, a median box and a bottom box. Between the top and median boxes on the one hand and the median and bottom boxes on the other hand, the frame has two openings. Each of these openings is further divided each time by means of a strut or brace 24, thus forming in the frame overall eight compartments, each receiving a panel 18. These eight compartments are distributed over two rows of four. Each compartment receives a panel 18 shown in greater detail on illustrations 3 and 4.

In what follows, to describe second door 12, one considers that such door is in the closed position. One considers that the front face of the door is the face of this door that is turned towards cockpit 2 and the rear face of this door is the one turned towards cabin 14, when second door 12 is in the closed position as shown on illustrations 1 and 3. The adjectives "inner" and "outer" are related to second door 12.

Each panel 18 has two plates: a front plate 26 and a rear plate 28.

Front plate 26 rests against the inner face of a first edge 30 attached to a side post 20 as well as on the outer face of a second edge 32 of central post 21. The first and second edges 30 extend for instance over the full height of the compartment receiving panel 18. The upper and lower edges of front plate 26 are preferably free.

Front plate 26 is held on the second edge 32 by means of turning latches 34. Each latch 34 is mounted on a pin 36. A spring, not shown, pre-stresses latch 34 supported on the outer face of front plate 26 to keep it supported against second edge 32. One and the same pin 36 can be used to hold the latches 34 acting on the two front plates 26 of panels of two adjacent compartments.

On the side of side post 20, front plate 26 is kept by a spacer 38 as indicated below. Side post 20 shows a third edge 40 that is facing first edge 30. Rear panel 28 is supported against the inner face of this third edge 40. Spacer 38 wedges front plate 26 and rear plate 28 against respectively the first and third edges 30, 40. A wedge 39 is provided between rear plate 28 and spacer 38. The form of this wedge 39 is adjusted on one side to the—considerably flat—form of rear plate 28 and on the other side to the form of spacer 38.

The distance separating the two edges 38 and 40 thus corresponds to the thickness of front plate 26 added to the thickness of rear plate 28 and to the height of the assembly formed by spacer 38 and wedge 39. Spacer 38 has for instance the form of a U iron of which the base is secured to the inner face of front plate 26. The legs of this U-iron are resting on wedge 39 that is attached to rear plate 38.

It is described on top how the vertical edge of rear plate 28 is held along side post 20. On the side of central post 21, the edge of rear plate 28 is resting against a fourth edge 42 on its outer face. This edge of rear plate 28 is held against fourth edge 42 by means of a small bar 44 that engages into the central post 21. One observes on illustrations 4 and 5, an opening 46 used for engaging the small bar 44 (shown on illustration 3). Also, one observes on illustrations 3 and 6 to 8 that rear plates 28 are provided with fingers 45 enabling to keep these plates on edge 42.

Illustrations 5 to 8 illustrate the behavior of panels 18 when a depression occurs in the front of the aircraft, for instance in cockpit 2, in other words, on the side of the front face of second door 12.

In such a case, when second door 12 is closed, it is sucked towards the inside of aisle 8. Frame 16 of second door 12 is rigid and is scheduled to withstand such a depression. Second door 12 is designed in such a way that panels 18 give away and are sucked inside aisle 8.

Initially, front plate 26 of each panel 18 is sucked inside aisle 8. First edge 30 is stationary. On the other hand, latches 34 pivot. When the force exerted against a latch 34 is sufficient (each latch 34 is pre-stressed by a spring), latch 34 pivots and releases front plate 26 from panel 18. This plate pivots then around a first edge 30 and pulls with it spacer 38. The latter then comes "rolling" onto wedge 39 of which the form is adjusted to facilitate the removal of spacer 38. The edge of rear plate 28 that was resting against third edge 40 is then freed and rear plate 28 starts to pivot with respect to fourth edge 42 (illustration 7). Fingers 45 permit the control of this pivoting movement while keeping the edge of rear plate 28 against fourth edge 42. A link 48 that may be a cable, a strap, a strip or similar, connects front plate 26 to rear plate 28. This link 48 is for instance secured to the spacer 38 on one side and to wedge 39 on the other side.

Illustration 8 shows two panels 18 that are fully open. One observes on this illustration a second link 50 (for instance, similar to link 48) that ties rear plate 28 of each panel 18 to central post 21. Plates 26 and 28 are thus held back and do not become projectiles that might go and hit (and possibly kill) a crew member.

The eight panels 18 open simultaneously. In fact, they are exposed to the same depression and as such must react in the same fashion. When the panels are fully open (illustration 8), only frame 16 of second door 12 is opposed to the air flow, back to front, linked to the depression caused at cockpit 2. This frame 16 shows little resistance to the flow and the loss of corresponding load is negligible (as are the stresses induced against the aircraft structure). Second door 12 described above thus does not disturb the operation of cockpit door 10 in case of depression in front of the aircraft, in cockpit 2.

One observes from the above description and from illustration 3 to 8 that the system proposed to release panels 18 is a system that can be reset. Indeed, once the panels are released from their compartments, they can be put back in place without a problem. It suffices to first put back rear plate 28 in its compartment in position against edges 42 and 40, then to put back in place front plate 26 against edges 30 and 32 before making the latches 34 pivot, thus resetting the corresponding springs (not shown).

The force of the springs acting on pivoting latches 34 is determined on the basis of the admissible load on second door 12. One can estimate that the maximum depression at this second door 12 is around 150 hPa. When such a depression exists, the panels have already been released. The force that is then exerted on second door 12 corresponds to the surface of the frame multiplied by the pressure exerted. To limit the forces exerted on second door 12, one can assume that this force is the maximum admissible force. If $P_{deci}$ is the depression value necessary to release panels 18, one foresees that $P_{deci}$ multiplied by the total surface area of second door 12 is less than the maximum force exerted against the door and previously calculated. The springs acting on the pivoting latches 34 are then adjusted according to the $P_{deci}$ value selected, of the surface area of panel 18 and of the number of pivoting latches 34 per panel.

One observes in the aforementioned description that the panels are released on the side of central post 21 and that once released, these panels, by virtue of the structure proposed, are considerably in the middle of aisle 8. First of all, this permits regrouping the panels and prevents having any on both sides of the aisle. The main reason for this regrouping of the panels towards the center of aisle 8 is however different. When a depression appears at cockpit 2, it propagates towards aisle 8. By reason of the depression, the modules, also called monuments, located on both sides of aisle 8 have a tendency to move towards each other, thus crimping the width of aisle 8. These monuments can then be deformed to such a point that they cover the vertical edges of second door 12. If then, panels 18 would release at the side posts 20, this release could be hampered, or even prevented, by the monuments. Second door 12 would then form a barrier that prevents equalizing pressures inside the aircraft. As we have seen above, this must be avoided needless to say. According to the position of the monuments located in aisle 8 with respect to the second door, one must as such possibly avoid placing the latches (or other means of release) on the lateral vertical posts and rather place them towards the center of the door.

In case of depression at cabin 14 of the aircraft, it is possible for instance to provide for second door 12 to open. This opening would cause loads due to the centrifugal force induced by the movement of the door on the top and bottom securing points of the door to the plane.

As indicated above, by the successive release of the front, then the rear plates, the structure of panels 18 described lets the air through as soon as a depression appears on the side of cockpit 2. However, the structure described is such that when one pushes against panels 18 from cabin 14 towards the cockpit, in other words, from the back to the front, the panels resist and do not release from frame 16.

Indeed, with reference to illustration 3, one observes that each rear plate 28 is retained by stationary components as long as corresponding front plate 26 is in place. One observes on the illustration that on one side, each rear plate 28 rests against a stationary fourth edge 42 and on the other side, it is resting, through a wedge 39 and a spacer 38 against a stationary first edge 30. As such, if a stress is exerted from the back to the front on rear plate 28, this effort is fully picked up by edges 42 and 30. The stress exerted does not act on the pivoting latches that can release corresponding panel 18.

Illustration 9 shows as an example a possible installation of the door to the aircraft structure. One recognizes on this illustration, a top beam 52 and a bottom beam 54. One recognizes also a pin around which the door pivots as well as ceiling 58 of cabin 14 and of aisle 8. This pin is made of two parts: a bottom tube 56 inside which can slide a circular cylindrical arm 57 telescopically. A locking system, for instance a bayonet system, is provided to lock the pieces, such as by movement, one with respect to the other.

Arm 57 forms the top part of pin 56 of second door 12. It is mounted pivoting in a stationary bearing 60 by a square piece 62 on top beam 52.

The bottom part of the door pin, formed by tube 56, is mounted on a self-aligning bearing. This bearing includes a stationary support 64 on bottom beam 54. This support 64 includes a housing with a spherical bearing 66. A ball 68 for which the diameter corresponds to that of the spherical bearing 66, possibly have a flat surface 70, is secured for instance by screwing to the bottom end of tube 56. The latter has, in a preferred form of execution, a spherical bearing to receive ball 68.

This ball 68, when taking place in spherical bearing 66 of support 64, provides for the automatic alignment of the door pin during the installation of support 64 on the aircraft floor, in other words, on bottom beam 54.

Telescopic pin of second door 12 enables a very easy installation and removal of this door. To install, arm 57 is slid inside tube 56. Once tube 56 is in place on ball 68, the door pin is turned to be considerably facing bearing 60. Arm 57 is then brought out and then locked in the "out" position. Disassembly is done easily by performing the installation operations in the opposite sequence.

Illustrations 12 to 14 show how air can circulate from the front to the back of the plane through second door 12. These illustrations show in greater detail the structure of the front 26 and rear 28 plates of panels 18.

To let air pass through, rear plate 28 is shown in the preferred form of execution shown on the drawing, in the form of a grill as is shown in illustration 14 for instance. Holes 72 are regularly distributed over the whole surface (except sometimes near the edges) of rear plate 28.

Front plate 26 is equipped with low pressure check valves. For instances, one can provide for two valves per panel 18 as is suggested on illustrations 12 and 13. At each valve, a cutout 74 is made in front plate 26. Each cutout 74 is fully covered with an elastic membrane 76 that is airtight. A cover 78 with a peripheral skirt 79 and an edge 80 is laid out over elastic membrane 76. This cover 78 is secured to the bottom face of front plate 26 at its edge 80. The outside contour of elastic membrane 76 is partially sandwiched between this edge 80 and bottom plate 26. If elastic membrane 76 and cover 78 for instance are rectangular, one can provide for instance that two opposite edges of elastic membrane 76 are held by edge 80 of cover 78 while the other two edges of elastic membrane 78 are free. Cover 78 extends in parallel to bottom plate 26 at a distance from it. Openings are made in the cover, for instance at peripheral skirt 79 to permit air to flow through.

Illustration 13 shows the check valves in their closed position. When a flow of air arrives from outside, in other words, a flow of air that is moving from the back to the front of the aircraft, it pushes elastic membrane 76 against front plate 26 thus obstructing corresponding cutout 74. On the other hand, as shown on illustration 12, when a flow of air arrives from the inside, in other words, a flow of air circulating from the front (aisle 8) to the back (cabin 14) of the airplane, elastic membrane 76 is released from the inner face of front plate 26 and is pushed towards cover 78. Then, air can pass through cutout 74, the free edges of elastic membrane 76, openings made in cover 78 and then through holes 72 of rear plate 28.

These check valves are used among other to permit ventilation of the area reserved for navigating personnel and accessed by aisle 8. They are also used when closing second door 12 to avoid putting the aisle under excessive pressure which would considerably hamper the closing of this second door 12. These valves can also serve when a depression occurs in cabin 14. Air can then flow from aisle 8 towards cabin 14.

It has been calculated that pressure variations at second door 12 during a depression in cabin 14 were considerably less than at cockpit door 10. Moreover, this pressure difference diminishes quickly, so that second door 12 can remain closed in case of depression in cabin 14 without disturbing the operation of cockpit door 10.

Elastic membrane 76 is for instance made of polyurethane. To collect the electric charges, sources of static electricity during their passage through the check valves, one can serigraph a network, in copper for instance, on each of elastic membranes 76 on the side of window 74. This network is then for instance connected electrically to link 48 itself connected electrically through rear plate 28 and link 50 to metal frame 16 of second door 12.

In a preferred form of execution, a provision is also made to filter the air passing through the check valves. A foam filter can then for instance be installed over cover 78 of each valve. It is also possible to provide a filter on the inner face (rather than on the outer face) of rear plate 28; this filter then covers holes 72 of this plate.

Illustrations 10 and 11 show an additional system that permits reinforcing second door 12. This system consists of an armor 82 that reinforces the structure of frame 16. This armor 82 links the main components of the frame to secure them even more one to the other. This armor 82 consists for instance of straps glued onto the frame components to link them. These straps are preferably made of carbon fibers. They are laid out on frame 16 so as to form a network comparable to a net or netting. As such, links are provided between the various straps. The latter are shown in the form of strips laid out along posts 20, 21, torsion boxes 22 and struts 24 so as not to hamper the ejection of panels 18 in case of depression inside the cockpit.

Armor 82 is preferably made of carbon fibers. This material has several advantages in this case. First of all, its mechanical strength permits strengthening the structure of frame 16 of second door 12. Then, straps made of this material are relatively light and as such they do not weigh down the structure of second door 12. Carbon fiber straps are also very difficult to cut. As such, in case of an attack, if a person attempts by force to push through second door 12, armor 82 then forms a very cumbersome netting for the assailant. The presence of this netting increases the time necessary for this assailant to pass through second door 12. This additional time can be precious for members of the crew who, in case of attack, can go and hide in cockpit 2 that is secured.

Second door 12 described above in its preferred mode of execution permits creating a private space for the members of the crew and preventing the passengers from seeing the cockpit door. This second door 12 also isolates the private space for navigating personnel from noise and sound thanks to its double barrier structure. The free space between the two plates of each panel permits good isolation from noise and sound.

Second door 12 also forms a barrier that delays access to the cockpit to a terrorist who wants to take control of the plane. This second door does not hamper operation of the cockpit door in case of a depression occurring inside the cabin of the plane or inside its cockpit.

This second door 12, as shown above, can be made of a light structural material—light alloy door frame, composite panels, . . . —and as such has an acceptable additional weight in an aircraft.

Needless to say, such a door is equipped with devices that make it possible to hold it in its closed position as well as in its open position. This door is also beneficially equipped with means to return it to its closed position. As such, as soon as the door is in an intermediate position between its open position and its closed position, it closes again automatically. Such devices are known to the specialist in the field and are not described here. For greater security, one can also provide for an access code to open this door. Other means of recognition (badge, etc.) can also be provided. Such a door can also be equipped with a surveillance device that enables members of the crew located on one side of the closed door to check the cabin.

When the second door is provided with valves enabling air to flow through, we have seen that rear plates 28 of panels 18 were perforated. These perforations can be used beneficially for the esthetics of the door. Indeed, rear plates 28 are located on the side of the cabin of the aircraft and are seen by the passengers. For instance, it is possible to provide a means for lighting between the two plates forming each panel to backlight the perforations of the rear plate. These perforations can then be arranged according to a special design (drawing, airline logo, letters, etc.)

As appears from the above, the door described here can meet numerous criteria:

- in case of depression inside the cockpit, it permits an equalization of the pressures;
- in case of depression inside the cabin, it permits also equalization of the pressures;
- this door is designed to stay whole even in case of very strong mechanical stresses;
- the weight of this door is relatively small;
- this door can be equipped with classic closing devices;
- surveillance systems (spying eye, camera, etc.) can be provided;
- this door can possibly close automatically;
- this door can possibly lock automatically;
- this door provides navigating personnel with a private space separate from the rest of the cabin;
- it is possible to produce an esthetic door that fits well with the rest of the cabin.

This invention is not limited to the preferential form of execution above as a non-limiting example. It also involves all variations of design available to the specialist in the field within the framework of the claims below.

The invention claimed is:

1. A door for closing an opening inside an aircraft, said opening being closed by said door when said door is in a closed position, wherein said opening is between a first compartment inside said aircraft and a second compartment inside said aircraft, said door comprising:
   a frame;
   at least a first panel mechanically coupled to said frame, each panel including a front plate mounted on a front side of the door facing a front of the aircraft and a rear plate mounted parallel to said front plate and on a rear side of the door facing a rear of the aircraft;
   an air control device mounted between said front plate and said rear plate, and configured, in said closed position, to let air pass through the door in one direction from said first compartment inside said aircraft to said second compartment inside said aircraft, said air control device being further configured, in said closed position, to prevent air to pass in an opposite direction from said second compartment inside said aircraft to said first compartment inside said aircraft; and
   a latch mechanism configured to separately release said front and rear plates from said frame, said latch mechanism comprising a front portion configured to releasably hold said front plate and a rear portion configured to releasably hold said rear plate, wherein said front portion is configured to release said front plate separately from said rear plate being released by said rear portion such that said front plate and said rear plate move relative to each other upon being released from said frame.

2. A door according to claim 1, wherein one of said front and rear faces is perforated.

3. A door according to claim 1, further comprising a filter associated with the device.

4. A door according to claim 1, wherein the front plate includes at least one low pressure check valve and wherein said rear plate defines a plurality of holes.

5. A door according to claim 1, wherein said panel has at least two opposite edges, wherein the two opposite edges of each panel each rest against said frame, with one of the two opposite edges of the panel being held on said internal structure by said latch mechanism that releases a corresponding panel in response to said predetermined load applied onto said corresponding panel.

6. A door according to claim 1, further comprising:
   a second panel mechanically coupled to said frame; and
   a second air control device mounted to said second panel and configured, in said closed position, to let air pass through the door in one direction from said first compartment inside said aircraft to said second compartment inside said aircraft, said second air control device being further configured, in said closed position, to prevent air to pass in an opposite direction from said second compartment inside said aircraft to said first compartment inside said aircraft; and
   wherein said latch mechanism is positioned between said first and second panels and is configured to mechanically couple said first and second plates to said frame when said predetermined load is not applied to said first and second panels and to release said first and second panels simultaneously from said frame when the predetermined load is applied to said first and second panels.

7. A door according to claim 1, wherein said front portion of said latch mechanism releases said front plate before said rear portion of said latch mechanism releases said rear plate.

8. A door according to claim 1, wherein said front portion of said latch mechanism releases said front plate independently of said rear portion releasing said rear plate.

9. A door according to claim 1, comprising at least a window configured to let air to pass through said window from said first compartment inside said aircraft to said second compartment inside said aircraft when said door is in said closed position, wherein said air control device comprises an elastic membrane which is deformable between a first position and a second position, wherein in said first position, said elastic membrane covers all of said window so as to prevent said air to pass in said opposite direction from said second compartment to said first compartment, and in said second position, a major part of said elastic membrane is removed from the window so as to let said air pass in said one direction from said first compartment to said second compartment.

10. A door according to claim 9, wherein the elastic membrane has at least one free edge.

11. A door according to claim 9, wherein said elastic membrane is made of polyurethane.

12. A door according to claim 9, wherein said elastic membrane has a metal grill on one of its faces, wherein said metal grill is electrically connected to an electrical ground.

13. A door according to claim 9, wherein said air control device further comprises a cover located at a distance from said window, on a side of said elastic membrane so as to limit deformation of membrane.

14. A door according to claim 13, wherein said cover has a perforated peripheral skirt and wherein a peripheral edge of the elastic membrane is sandwiched between an edge of said perforated peripheral skirt and a boundary of said window.

15. An aircraft comprising a door according to claim 1.

16. An aircraft according to claim 15, wherein said first compartment comprises a cockpit of said aircraft and said second compartment comprises a passenger cabin of said aircraft, and wherein said device of said door is configured, in said closed position, to let air pass through the door in said one direction from said cockpit to said passenger cabin and configured, in said closed position, to prevent air to pass in said opposite direction from said passenger cabin to said cockpit.

17. A door according to claim 1, wherein said device is a low pressure check valve.

18. A door according to claim 17, wherein said door comprises a plurality of panels and each of said panels comprises at least one of said low pressure check valve.

19. A door according to claim 17, wherein said door comprises a plurality of panels and each of said panels comprises two low pressure check valves.

20. A door according to claim 1, wherein said front plate defines a first cutout, said air control device comprising a first airtight elastic membrane located between said front and rear plates and covering said first cutout, wherein said first airtight elastic membrane has edges held to the front plate at a periphery of said first cutout and at least one unattached free edge such that air can pass through said first cutout and between said free edge and said front plate.

21. A door according to claim 20, wherein said front plate defines a second cutout, said air control device comprising a second airtight elastic membrane located between said front and rear plates and covering said second cutout, wherein said second airtight elastic membrane has edges held to the front plate at a periphery of said second cutout and at least one unattached free edge such that air can pass through said second cutout and between said free edge of said second airtight elastic membrane and said front plate.

22. A door according to claim 21, wherein said air control device further comprises a first cover between said first membrane and said rear plate and a second cover between said second membrane and said rear plate, each of said first and second covers being configured to contact a respective elastic membrane when said membrane is away from a respective cutout, and each cover having openings to permit air to flow through.

* * * * *